Patented July 21, 1931

1,815,146

UNITED STATES PATENT OFFICE

BERNHARD ERBER, OF VIENNA, AUSTRIA

METHOD OF PRODUCING OPENINGS, PASSAGES, AND THE LIKE IN MOLTEN OR PRESSED GLASS BODIES

No Drawing. Application filed November 29, 1927, Serial No. 236,591, and in Austria December 1, 1926.

This invention relates to an improvement in or modification of the invention disclosed in my prior specification Serial No. 198,642, filed on the 13th June, 1927, which consisted in producing such openings by fusing into the glass material a simple wire of about the diameter of the aperture to be produced and of a coefficient of expansion higher than that of the glass, the said wire being withdrawn after cooling and leaving behind it an open aperture. A wire of copper or other material is advantageously employed, the surface of which dissolves in the molten glass.

The present invention relates to a further development of this process, whereby the range of materials available for the wire is quite considerably extended. According to the present invention, for the production of the aperture a composite wire is employed, consisting of a metallic core and a coating of the same or a different metal, the core and the coating being so selected and being in such proportions that the coefficient of expansion of the composite wire is higher than that of the glass. It is advantageous to select for the coating a metal which dissolves easily in the molten glass, so that after cooling, substantially only the metal core is removed from the glass. For the production of the coating any suitable process may be employed, such as an electroplating process for example.

It is also advantageous to isolate the metallic coating from the core by means of an intermediate layer of graphite, talc, or similar material.

The high temperature at which the wire is sealed into the glass and the free access of air to the surface of the wire during the heating cause oxidation of the larger part of the surface covering of the wire so that a solution of the thin oxide layer is produced in the fused glass material. This oxidation process occurs more readily in electro-deposited coatings, since the porous nature of such layers favours the access of atmospheric oxygen. That part of the surface layer which remains unoxidized enters the glass and remains adhered there in the metallic state.

The ease of loosening of the core is increased when the coating is deposited electrolytically, since such coatings, even when there is no intermediate layer, have less affinity for the metal core. Thus for the purposes of the invention, a copper core with a coating of electrolytic copper is in all circumstances preferable to a non-coated copper wire.

The object of the copper coating is to provide a removable surface to the wire, so that when the coated wire is fused in the glass the coating is held by the latter in the manner indicated above, and since the wire is so chosen that its coefficient of expansion is higher than that of glass on cooling it contracts more than the aperture in the glass and consequently becomes detached from its covering, which now lines the said aperture, and as a consequence the wire can be easily withdrawn from the aperture.

The invention will now be described with reference to an example. Brass has been found to be advantageous for the process, inasmuch as its coefficient of expansion exceeds that of copper, only it has the disadvantage that its heated surface does not dissolve in the molten glass so easily as a heated copper. Now in order to enable brass wire to be advantageously employed for the process the same is preferably first coated with a layer of graphite and then by electro-deposition with a layer of copper, which latter is almost wholly oxidized at the high temperature of the fusion process and so dissolves in the molten glass, so that, after cooling, the brass core can be easily withdrawn from the passage formed. With similarly good success a copper wire may be employed, with a coating of copper, and in fact any composite wire consisting of a metallic core and a metallic coating, provided its coefficient of expansion is higher than that of the glass, and the coating admits of being advantageously released after cooling.

What I claim is:—

A method of producing openings, passages, capillaries and the like in molten or pressed glass bodies, comprising fusing into the glass material a composite wire consisting of a metallic core, a metallic coating and a layer of graphite, talc and the like between said core and said coating, said composite wire having about the diameter of the opening to be made and a coefficient of expansion higher than that of the glass, and withdrawing said metallic core after cooling and leaving the free opening in the glass.

In testimony whereof I have signed my name to this specification.

ING. BERNHARD ERBER.